United States Patent
Furukawa et al.

(10) Patent No.: US 6,372,823 B1
(45) Date of Patent: Apr. 16, 2002

(54) CATIONICALLY ELECTRODEPOSITABLE COATING COMPOSITION

(75) Inventors: Hidenori Furukawa, Nagoya; Takahisa Kasukawa, Yokohama, both of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/671,290

(22) Filed: Sep. 27, 2000

(30) Foreign Application Priority Data

Sep. 27, 1999 (JP) .......................................... 11-272259

(51) Int. Cl.⁷ ............................ C08K 3/20; C08L 63/02
(52) U.S. Cl. ................. 523/410; 523/411; 523/412; 525/107; 525/114; 525/117; 525/119; 525/121; 428/418
(58) Field of Search ................................ 523/410, 411, 523/412; 525/107, 114, 117, 119, 121; 428/418

(56) References Cited

U.S. PATENT DOCUMENTS 5,684,095 A * 11/1997 Morimoto et al. .......... 525/438

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

The present invention provides a cationically electrodepositable coating composition comprising:

(A) a water-soluble or water-dispersible resin obtained by reacting a hydroxyl group of a bisphenol A type epoxy resin with a cyclic ester compound, (B) a vinyl resin having a solubility parameter value of less than 9.6, (C) polyalkylene glycol having a solubility parameter value of less than 9.6, and (D) a pigment component having an average particle diameter of 0.5 μm or less.

22 Claims, No Drawings

CATIONICALLY ELECTRODEPOSITABLE COATING COMPOSITION

BACKGROUND OF THE INVENTION

1. Field of the Invention

The present invention relates to a cationically electrodepositable coating composition forming a coating film which does not cause cissing and is excellent in performances such as a flatness, an adhesion to an adjacent coating film and a chipping resistance.

2. Description of the Prior Art

A cationically electrodepositable coating material is excellent in a throwing property and a corrosion resistance and therefore is used for an undercoating material for car bodies in many cases. For the sake of rust-prevention and cissing prevention on a coated surface, a scaly pigment such as talc and silica and a vinyl resin having a low solubility parameter value (SP value) are added, and a hydrophilic plasticizing component is added to a terminal of a base epoxy resin.

However, caused are the problems that addition of a scaly pigment and addition of a hydrophilic plasticizing component to an epoxy resin reduce a corrosion resistance, an impact resistance and a chipping resistance of a coating film and a flatness on a coated surface and that addition of a vinyl resin having a low SP value reduces an adhesive property with an adjacent intermediate coating film and top coating film.

A principal object of the present invention is to solve the problems described above and provide a novel cationically electrodepositable coating composition forming a coating film which prevents cissing from being caused on a coated surface without reducing throwing property and a corrosion resistance and is excellent in performances such as an impact resistance, a chipping resistance and an adhesive property with other coating films.

SUMMARY OF THE INVENTION

Thus, provided according to the present invention is a cationically electrodepositable coating composition comprising:

(A) a water-soluble or water-dispersible resin obtained by reacting a hydroxyl group of a bisphenol A type epoxy resin with a cyclic ester compound, (B) a vinyl resin having a solubility parameter value of less than 9.6, (C) polyalkylene glycol having a solubility parameter value of less than 9.6, and (D) a pigment component having an average particle diameter of 0.5 $\mu$m or less.

The cationically electrodepositable coating composition of the present invention shall be explained below in detail.

DESCRIPTION OF SPECIFIC EMBODIMENTS

Component (A): water-soluble or water-dispersible resin obtained by reacting a hydroxyl group of a bisphenol A type epoxy resin with a cyclic ester compound A bisphenol A type epoxy resin which constitutes the base of the resin component (A) is a resin having together a phenolic hydroxyl group and an epoxy group in a molecule, and to be specific, preferred is a resin having at least 0.5, particularly 0.8 to 2 phenolic hydroxyl groups on an average and at least 2, particularly 2 epoxy groups on an average in a molecule. Further, the above resin has preferably a number average molecular weight falling in a range of usually about 400 to about 1000, particularly about 450 to about 700.

Such bisphenol A type epoxy resin includes, for example, 2,2-bis(4-hydroxyphenyl)propane(bisphenol A); 1,1-bis(4-hydroxyphenyl)ethane; bis(4-hydroxyphenyl)methane (bisphenol F); 4,4'-dihydroxydiphenylsulfone (bisphenol S); and glycidyl ethers of polyphenols such as a phenol novolak and a cresol novolak, and polymers thereof. In particular, bisphenol A is suited.

The cyclic ester compound which is reacted with such bisphenol type epoxy resins as described above includes, for example, lactones having 3 to 10 carbon atoms, such as $\delta$-valerolactone, $\epsilon$-caprolactone, $\zeta$-enalactone, $\eta$-caprylolactone, $\gamma$-valerolactone, $\delta$-caprolactone, $\epsilon$-enalactone and $\zeta$-caprylolactone. In particular, $\epsilon$-caprolactone is suited.

The component (A) can be obtained by subjecting a hydroxyl group of the bisphenol A type epoxy resin to a ring-opening addition reaction with the cyclic ester compound. This resin component (A) has a number average molecular weight falling preferably in a range of usually about 1000 to about 7000, particularly about 2000 to about 5000.

This addition reaction can be carried out by known methods, for example, by heating at 100 to 250° C. for about one to about 15 hours in the presence of a catalyst for accelerating the reaction, for example, a titanium compound such as tetrabutoxytitanium and tetrapropoxytitanium, an organic tin oxide such as tin octylate, dibutyltin oxide and dibutyltin laurate, or stannous chloride.

A side chain which has a primary hydroxyl group excellent in a reactivity based on ring-opening of the cyclic ester compound and which has a large plasticizing capacity is introduced into the epoxy resin by this addition reaction, and therefore it is estimated that a coating film formed can be improved in a corrosion resistance, an adhesive property, an impact resistance, a chipping resistance and a finishing property by using a coating composition containing this epoxy resin.

A use amount of the cyclic ester compound is preferably controlled so that a content of a moiety contained in the resin component (A), which originates in the cyclic ester compound falls in a range of usually 5 to 40% by weight, particularly 10 to 35% by weight.

The resin component (A) thus obtained can be used as a cationically electrodepositable resin after an epoxy group contained in the above resin is reacted with an amino compound in order to make it water-soluble or water-dispersible and then neutralized with an acid.

The amino compound may be any one as long as it can be reacted with an epoxy group to introduce a secondary amino group or a tertiary amino group into the resin component (A) and includes aliphatic, alicyclic and aromatic-aliphatic primary or secondary amines. It includes, for example primary monoamines such as methylamine, ethylamine, n- or iso-propylamine, monoethanolamine and n- or iso-propanolamine; secondary monoamines such as diethylamine, diethanolamine, di-n- or iso-propanolamine, N-methylethanolamine and N-ethylethanolamine; and primary or secondary polyamines such as ethylenediamine, diethylenetriamine, hydroxyethylaminoethylamine, ethylaminoethylamine, methylaminopropylamine, dimethylaminoethylamine and dimethylaminopropylamine. Among these amino group-containing compounds, primary amines and N-hydroxyl secondary amines are preferably reacted in advance with ketone, aldehyde or carboxylic acid to be turned to aldimines, ketimines, oxazolines or imidazolines, and then they are preferably reacted with an epoxy group. A use amount of these amino group-containing compounds is preferably such an extent that the resulting resin has an amine value falling in a range of usually 15 to 100, particularly 30 to 80.

The acid used for neutralizing the resin component (A) reacted with the amino compound includes, for example, water-soluble organic acids such as formic acid, acetic acid, glycolic acid and lactic acid, and an extent of neutralization falls suitably in a range of 0.8 to 1.2 equivalent ratio.

Component (B): Vinyl Resin Having a Solubility Parameter Value of Less than 9.6

In the present specification, a solubility parameter value (hereinafter referred to as an SP value) of the vinyl resin can be determined by turbid point titration, and to be specific, it can be calculated according to the following equation of K. W. Suh and J. M. Corbett (Journal of Applied Polymer Science, 12, 2359, 1968):

$$SP = \frac{\sqrt{V_H} \cdot \delta_H + \sqrt{V_D} \cdot \delta_D}{\sqrt{V_H} + \sqrt{V_D}}$$

wherein $V_H$ is a volume proportion of n-hexane; $V_D$ is a volume proportion of deionized water; $\delta_H$ is an SP value of n-hexane and $\delta_D$ is an SP value of deionized water.

In the turbid point titration, n-hexane is slowly added to a solution prepared by dissolving 0.5 g (solid matter) of the dried vinyl resin in 10 ml of acetone, and a titrating amount H (ml) in the turbid point is read. Deionized water is added to the acetone solution in the same manner, and a titrating amount D (ml) in the turbid point is read. Then, these values are applied to the following equation to calculate $V_H$, $V_D$, $\delta_H$ and $\delta_D$. The SP values of the respective solvents used in the present turbid point titration are 9.75 for acetone, 7.24 for n-hexane and 23.43 for deionized water:

$V_H = H/(10+H)$ $V_D = D/(10+D)$ $\delta_H = 9.75 \times 10/(10+H) + 7.24 \times H/(10+H)$ $\delta_D = 9.75 \times 10/(10+D) + 23.43 \times D/(10+D)$ The vinyl resin having an SP value falling in a range of less than 9.6, preferably 9.0 to less than 9.6, particularly preferably 9.1 to 9.5 can be obtained, for example, by polymerizing at least one monomer selected from monomers shown below. The SP value can readily be controlled by changing a composition and a proportion of the monomers.

1) ($C_1$ to $C_{24}$)alkyl esters of acrylic acid or methacrylic acid, such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, octyl acrylate, octyl methacrylate, stearyl acrylate and stearyl methacrylate.

2) ($C_2$ to $C_{18}$)fluoroalkyl esters of acrylic acid or methacrylic acid, such as perfluorobutylethyl acrylate, perfluorobutylethyl methacrylate, perfluoroisononylethyl acrylate and perfluoroisononylethyl methacrylate.

3) Cycloalkyl esters of acrylic acid or methacrylic acid, such as cyclohexyl acrylate and cyclohexyl methacrylate.

4) Aromatic compounds such as styrene, α-methylstyrene and vinyltoluene.

5) Vinyl compounds such as acrylonitrile, vinyl chloride and vinyl acetate.

6) Epoxy group-containing monomers such as glycidyl acrylate, glycidyl methacrylate and ally glycidyl ether.

7) Hydroxyl group-containing polymerizable monomers such as 2-hydroxyethyl acrylate, 2-hydroxyethyl methacrylate, 3-hydroxybutyl acrylate, 3-hydroxybutyl methacrylate, polyethylene glycol monoacrylate, polyethylene glycol monomethacrylate, caprolactone-modified hydroxyethyl acrylate and caprolactone-modified hydroxyethyl methacrylate.

8) Carboxyl group-containing polymerizable monomers including acid anhydride group-containing polymerizable monomers such as maleic anhydride and itaconic anhydride; monomers obtained by half-esterifying these acid anhydride group-containing polymerizable monomers with low molecular weight monoalcohols; free carboxyl group-containing polymerizable monomers such as acrylic acid, methacrylic acid, maleic acid, fumaric acid, itaconic acid, mesaconic acid, citraconic acid and chlorinated maleic acid; and polymerizable monomers obtained by half-esterifying polymerizable monomers containing two or more free carboxyl groups, such as maleic acid, fumaric acid, itaconic acid, mesaconic acid, citraconic acid and chlorinated maleic acid with low molecular weight monoalcohols.

(Co)polymerization of the polymerizable monomers described above can be carried out by (co)polymerizing the resulting vinyl resin with at least one polymerizable monomer described above which is selected considering a desired SP value by a conventionally known polymerization method, for example, solution polymerization, bulk polymerization and suspension polymerization.

The vinyl resin thus obtained can have a number average molecular weight falling in a range of usually 3000 to 30000, particularly 5000 to 20000. Further, it may have a functional group such as an epoxy group, a carboxyl group and a hydroxyl group.

An acryl resin is particularly suited as the vinyl resin in the present invention.

Component (C): Polyalkylene Glycols Having a Solubility Parameter Value of Less than 9.6

They are polyetherified compounds of glycols, and the glycols include, for example, at least one ($C_2$ to $C_{12}$) alkylene glycol selected from ethylene glycol, propylene glycol, butylene glycol, hexylene glycol, pentanediol, hexanediol, diethylene glycol, dipropylene glycol and triethylene glycol.

Polyalkylene glycol which is used as the component (C) in the present invention has an SP value falling preferably in a range of less than 9.6, particularly 9.0 to 9.6 and further particularly 9.1 to 9.5. The SP value of polyalkylene glycol can readily be controlled empirically by suitably selecting the kind of alkylene glycol constituting the above polyalkylene glycol and a molecular weight of the resulting polyalkylene glycol.

Further, the polyalkylene glycol as the component (C) can have a number average molecular weight falling in a range of usually 1000 to 10000, preferably 1500 to 5000.

Component (D): Pigment Component Having an Average Particle Diameter of 0.5 μm or Less Conventional pigments for a coating material can be used for the pigment component and include, for example, organic or inorganic pigments such as titan white, carbon black, molybdate orange, red iron oxide, azo pigments, anthraquinone base, thioindigo base, perylene base, quinacridone base, chrome yellow, titan yellow, monoazo base, disazo base, metal complex base, chrome green, phthalocyanine green, ultramarine, cobalt blue and phthalocyanine blue; rust preventive pigments such as zinc powder, zinc chromate, strontium chromate, basic lead chromate, basic lead sulfate and phosphate base rust preventive pigments; and extender pigments such as calcium carbonate, kaolin, clay, diatomaceous earth, fine powder silicic acid hydrate, talc, barium sulfate, barium carbonate and silica sand. They can be sued alone or may be used in combination of two or more kinds thereof.

The pigment used as the component (D) is preferably controlled so that an average particle diameter thereof falls in a range of 0.5 μm or less, preferably 0.01 to 0.4 μm after dispersed in the coating material. In this case, the average particle diameter means an average value in a particle size distribution curve (usually, a normal distribution curve).

When a scaly pigment such as talc and clay is used as at least a part of the pigment as the component (D), the use amount thereof is preferably controlled so that the total oil absorption of the scaly pigment per 100 parts by weight (solid matter) of the resin contained in the coating material is 400 or less, particularly 350 or less. An oil absorption of a pigment is an amount of oil required for mechanically wetting and mixing the pigment with the oil to prepare a hard pasty product, and to be specific, it is represented by a ml number of refined linseed oil per 100 g of the pigment.

When using "a" parts by weight of a scaly pigment having an oil absorption of "x" and "b" parts by weight of a scaly pigment having an oil absorption of "y" each per 100 parts by weight (solid matter) of the resin, the total oil absorption of the scaly pigments per 100 parts by weight (solid matter) of the resin is a value calculated from the following equation:

$$(x \times a) + (y \times b)$$

Cationically Electrodepositable Coating Composition

The cationically electrodepositable coating composition of the present invention comprises the component (A): the water-soluble or water-dispersible resin obtained by reacting a hydroxyl group of the bisphenol A type epoxy resin with the cyclic ester compound, the component (B): the vinyl resin having a solubility parameter value (SP value) of less than 9.6, the component (C): polyalkylene glycol having a solubility parameter value (SP value) of less than 9.6, and the component (D): the pigment component having an average particle diameter of 0.5 μm or less. The constitutional percentages of these respective components shall not strictly be restricted and can be changed according to uses of the finished coating composition. In general, the components (B) to (D) are suitably used in amounts failing in the following ranges per 100 parts by weight of the component (A) in terms of a solid matter ratio.

| Usual range | Suited range | More suited range |
| --- | --- | --- |
| Component (B) | | |
| 0.5 to 10 weight parts | 0.75 to 7.5 weight parts | 1 to 5 weight parts |
| Component (C) | | |
| 0.1 to 10 weight parts | 0.3 to 7.5 weight parts | 0.5 to 5 weight parts |
| Component (D) | | |
| 5 to 50 weight parts | 7.5 to 40 weight parts | 10 to 30 weight parts |

Further, the cationically electrodepositable coating composition of the present invention can suitably contain additives such as a curing agent, a defoaming agent, a cissing preventive, a settling preventive, a curing catalyst and an organic solvent in addition to the components (A) to (D).

A block polyisocyanate compound can suitably be used as the curing agent. To be specific, it includes compounds obtained by blocking isocyanate groups of polyisocyanate compounds having two or more free isocyanate groups in a molecule with a blocking agent. The polyisocyanate compound includes, for example, aromatic diisocyanates such as tolylenediisocyanate, diphenylmetanediisocyanate, xylylenediisocyanate and naphthalenediisocyanate; aliphatic diisocyanates such as tetramethylenediisocyanate, hexamethylenediisocyanate, dimeric acid diisocyanate and lysine diisocyanate; alicyclic diisocyanates such as methylenebis(cyclohexylisocyanate), isophoronediisocyanate, methylcyclohexanediisocyanate, cyclohexanediisocyanate and cyclopentanediisocyanate; buret type adducts and isocyanuric ring type adducts of the above polyisocyanate compounds; and free isocyanate group-containing prepolymers obtained by reacting these polyisocyanate compounds with low molecular weight or high molecular weight polyols in isocyanate group excess. Capable of being used as the blocking agent are, for example, conventionally known compounds such as phenols, oximes, lactams, an active methylene base, alcohols, an acid amide base, an imide base, an amine base, an imidazole base, a urea base, a carbamic acid base, an imine base and mercaptans. The block polyisocyanate compound has a number average molecular weight falling preferably in a range of usually 200 to 10000, particularly 300 to 5000. A blending amount of such block polyisocyanate compound falls preferably in a range of 100 parts by weight or less, particularly 10 to 70 parts by weight per 100 parts by weight (solid matter) of the component (A) described above.

The cationically electrodepositable coating composition of the present invention can be prepared, for example, by further adding, if necessary, other additives to the components (A) to (D) and mixing them in an aqueous medium.

The cationically electrodepositable coating composition of the present invention thus prepared is usually controlled in a solid matter concentration falling in a range of 5 to 40% by weight, preferably 7 to 30% by weight to form a cationically electrodepositable bath and can be electrodepositably coated at a pH of 3 to 9, preferably 5 to 7 with a coated article being used as a cathode on the conditions of a bath temperature of 20 to 35, a voltage of 100 to 400 V, preferably 150 to 350 V and a current flow time of 1 to 10 minutes, preferably 2 to 8 minutes. In this case, the coating film thickness can be controlled in a range of about 5 to about 40 μm, preferably about 10 to about 25 μm in terms of a cured film thickness. The coating film can be cured by baking usually at a temperature of 150 to 200 for about 10 to about 40 hours.

The cationically electrodepositable coating composition of the present invention described above prevents cissing from being caused without reducing a throwing property and a corrosion resistance and can further be improved in a flatness, an adhesion to an adjacent coating film and a chipping resistance. It can advantageously be used, for example, as a prior for a base substance for car bodies and home electric products.

EXAMPLES

The present invention shall more specifically be explained below with reference to examples and comparative examples. Parts and percentages are based on weight, and a film thickness of the coating film is shown in terms of a cured coating film.

1. Preparation of Samples (1) Component (A):
    (A-a): a resin prepared by reacting a ε-caprolactone-modified bisphenol A type epoxy resin with diethanolamine and then neutralizing it with formic acid. A content of ε-caprolactone was 20% based on the above resin (solid matter). Number average molecular weight: about 35000.

(A-b): a resin prepared by reacting a bisphenol A type epoxy resin with diethanolamine and then neutralizing it with formic acid. A content of ε-caprolactone was 0%. Number average molecular weight: about 35000.

(2) Component (B):

(B-a): an acryl resin prepared by copolymerizing isobutyl acrylate, hydroxyethyl methacrylate and dimethylaminoethyl methacrylate, and it had an SP value of 9.3 and a number average molecular weight of 7000.

(B-b): an acryl resin prepared by copolymerizing isobutyl acrylate, hydroxyethyl methacrylate and dimethylaminoethyl methacrylate, and it had an SP value of 9.8 and a number average molecular weight of 7000.

(3) Component (C):

(C-a): polypropylene glycol having an SP value of 9.1 and a number average molecular weight of 3000.

(C-b): polytetramethylene glycol having an SP value of 9.7 and a number average molecular weight of 3000.

(4) Pigment Component (D):

(D-a): prepared by mixing 5 parts (solid matter) of the (A-a) component described above with 15 parts of a titan white pigment having an average particle diameter controlled to 0.4 μm, 0.3 part of carbon black, 2 parts of lead silicate and 2 parts of dioctyltin oxide (catalyst) and dispersing them.

(D-b): prepared by mixing 5 parts (solid matter) of the (A-b) component described above with 15 parts of a titan white pigment having an average particle diameter controlled to 1.0 μm, 0.3 part of carbon black, 2 parts of lead silicate and 2 parts of dioctyltin oxide (catalyst) and dispersing them.

(5) Curing Agent:

Prepared by blocking isocyanate groups of "Duranate TPA-100" (trade name, a polyisocyanate compound of a hexamenthylenediisocyanate base manufactured by Asahi Chemicals Ind. Co., Ltd.) with methylethylketoxime.

2. Examples and Comparative Examples

Example 1

Mixed were 100 parts (solid matter) of the component (A-a), 30 parts (solid matter) of the curing agent, 2 parts (solid matter) of the component (B-a), 1 part (solid matter) of the component (C-a) and 24.3 parts (solid matter) of the pigment component (D-a), and water as added to obtain a cationically electrodepositable coating material having a solid content of 15%.

Comparative Example 1

Mixed were 100 parts (solid matter) o f the component (A-a), 30 parts (solid matter) of the curing agent, 5 parts (solid matter) of the component (B-a) and 24.3 parts (solid matter) of the pigment component (D-a), and water was added to obtain a cationically electrodepositable coating material having a solid content of 15%.

Comparative Example 2

Mixed were 100 parts (solid matter) of the component (A-a), 30 parts (solid matter) of the curing agent, 2 parts (solid matter) of the component (C-a) and 24.3 parts (solid matter) of the pigment component (D-a), and water was added to obtain a cationically electrodepositable coating material having a solid content of 15%.

Comparative Example 3

Mixed were 100 parts (solid matter) of the component (A-a), 30 parts (solid matter) of the curing agent, 2 parts (solid matter) of the component (B-b), 1 part (solid matter) of the component (C-b) and 24.3 parts (solid matter) of the pigment component (D-a), and water was added to obtain a cationically electrodepositable coating material having a solid content of 15%.

Comparative Example 4

Mixed were 100 parts (solid matter) of the component (A-b), 30 parts (solid matter) of the curing agent, 2 parts (solid matter) of the component (B-a), 1 part (solid matter) of the component (C-a) and 24.3 parts (solid matter) of the pigment component (D-a), and water was added to obtain a cationically electrodepositable coating material having a solid content of 15%.

Comparative Example 5

Mixed were 100 parts (solid matter) of the component (A-a), 30 parts (solid matter) of the curing agent, 2 parts (solid matter) of the component (B-a), 1 part (solid matter) of the component (C-a) and 24.3 parts (solid matter) of the pigment component (D-b), and water was added to obtain a cationically electrodepositable coating material having a solid content of 15%.

3. Performance Test Results

A bath temperature of the cationically electrodepositable coating material obtained in the examples and comparative examples described above was controlled to 28° C., and an SPC dull steel plate subjected to surface treatment with "PB-L3080" (trade name, manufactured by Nihon Parkerizing Co., Ltd.) was dipped therein as a cathode to apply an electric current at 250 V so that a coating film having a film thickness of 20 μm was formed. Thereafter, it was pulled up and washed with water, and then the electrodepositably coated plate was baked at 170° C. for 20 minutes to cure the coating film thereon.

Next, an intermediate coating material ("TP65 Gray", trade name, manufactured by Kansai Paint Co., Ltd.) was coated on this electrodepositably coated surface so that the film thickness became 20 μm and cured by-baking at 140° C. for 30 minutes, and then a colored top coating material ("Neo-Amilac 6000 White", trade name, manufactured by Kansai Paint Co., Ltd.) was further coated thereon so that the film thickness became 40 μm and cured by baking at 140° C. for 30 minutes.

The coating films thus obtained were subjected to performance tests, and the results thereof are shown in Table 1.

TABLE 1

|  | Example | Comparative Example | | | | |
| --- | --- | --- | --- | --- | --- | --- |
|  | 1 | 1 | 2 | 3 | 4 | 5 |
| Flatness | ◯ | Δ | ◯ | ◯ | Δ | Δ |
| Cissing resistance | ◯ | ◯ | X | X | ◯ | ◯ |
| Chipping resistance | ◯ | ◯ | ◯ | ◯ | X | Δ |
| Adhesive property | ◯ | X | Δ | ◯ | X | ◯ |

The tests were carried out by the following methods.

Flatness

The electrodepositably coated film on the electrodepositably coated plate cured before applying the intermediate coating material and the top coating material was measured for a surface roughness Ra by means of a surface roughness meter ("Surfcom 550A", trade name, manufactured by Tokyo Seimitsu Co., Ltd.), wherein ○ shows that Ra is less than 0.2 µm; Δ A shows that Ra is 0.2 to 0.25 µm; and × shows that Ra is less than 0.25 µm or more.

Cissing Resistance

One or two droplets of oil (Nox Rust 880P manufactured by Nihon Parkerizing Co., Ltd.) were adhered on an uncured electrodepositably coated surface, and then the coating film was cured by baking at 170° C. for 20 minutes, followed by checking the coated surface thereof, wherein ○ shows that cissing is not caused at all; Δ shows that fine cissing having a diameter of less than 1 mm has been caused; and × shows that cissing having a diameter of 1 mm or more has been caused.

Chipping Resistance

Blown was 50 g of No. 7 crushed stones against the coated surface obtained by coating the top coating material and curing it at an angle of 45° to the coated surface at an air pressure of 4 kg/cm$^2$ at −20° C. , and then the coated surface was observed, wherein ○ shows that a part where the coating film has been peeled off by blowing the crushed stones has a diameter of less than 1 mm; Δ shows that a part where the coating film has been peeled off has a diameter of 1 mm or more and less than 2 mm; and × shows that a part where the coating film has been peeled off has a diameter of 2 mm or more.

Adhesive Property

The coated surface obtained by coating the top coating material and curing it was cut by means of a cutter so that it reached the base to form 100 cross-cuts having a size of 1 mm×1 mm. An adhesive tape was stuck on the coated surface and quickly peeled at 20° C., and then the number of the residual cross-cut coating films was determined, wherein ○ shows that 100 cross-cuts remain; Δ shows that 99 to 95 cross-cuts remain; and × shows that 94 or less cross-cuts remain.

What is claimed is:

1. A cationically electrodepositable coating composition comprising:
   (A) a water-soluble or water-dispersible resin obtained by reacting a hydroxyl group of a bisphenol A type epoxy resin with a cyclic ester compound, reacting the resulting resin with an amino compound and then neutralizing with an acid,
   (B) a vinyl resin having a solubility parameter value of less than 9.6,
   (C) polyalkylene glycol having a solubility parameter value of less than 9.6, and
   (D) a pigment component having an average particle diameter of 0.5 µm or less.

2. The coating composition as described in claim 1, wherein the bisphenol A type epoxy resin in the resin component (A) has at least 0.5 phenolic hydroxyl group on an average and at least 2 epoxy groups on, an average in a molecule and has a number average molecular weight falling in a range of about 400 to about 1000.

3. The coating composition as described in claim 2, wherein the bisphenol A type epoxy resin is bisphenol A.

4. The coating composition as described in claim 1, wherein the cyclic ester compound in the resin component (A) is selected from lactones having 3 to 10 carbon atoms.

5. The coating composition as described in claim 4, wherein the cyclic lactone is selected from the group consisting of δ-valerolactone, ε-caprolactone, η-caprylolactone, γ-valerolactone, δ-caprolactone and ζ-caprylolactone.

6. The coating composition as described in claim 5, wherein the cyclic lactone is ε-caprolactone.

7. The coating composition as described in claim 1, wherein the resin (A) has a number average molecular weight falling in a range of about 1000 to about 7000.

8. The coating composition as described in claim 1, wherein the resin (A) contains a moiety which originates in the cyclic ester compound in a range of 5 to 40% by weight.

9. The coating composition as described in claim 1, wherein the vinyl resin (B) has a solubility parameter of 9.0 to less than 9.6.

10. The coating composition as described in claim 1, wherein the vinyl resin (B) has a number average molecular weight falling in a range of 3000 to 30000.

11. The coating composition as described in claim 1, wherein the vinyl resin (B) is an acryl resin.

12. The coating composition as described in claim 1, wherein the polyalkylene glycol (C) has a solubility parameter value of 9.0 to less than 9.6.

13. The coating composition as described in claim 1, wherein the polyalkylene glycol (C) is poly ($C_2$ to $C_{12}$) alkylene glycol.

14. The coating composition as described in claim 1, wherein the polyalkylene glycol (C) has a number average molecular weight falling in a range of 1000 to 10000.

15. The coating composition as described in claim 1, wherein the pigment component (D) has an average particle diameter falling in a range of 0.01 to 0.4 µm.

16. The coating composition as described in claim 1, comprising 0.5 to 10 parts by weight of the vinyl resin (B), 0.1 to 10 parts by weight of the polyalkylene glycol (C) and 5 to 50 parts by weight of the pigment component (D).

17. The coating composition as described in claim 1, comprising 1 to 5 parts by weight of the vinyl resin (B), 0.5 to 5 parts by weight of the polyalkylene glycol (C) and 10 to 30 parts by weight of the pigment component (D).

18. The coating composition as described in claim 1, further comprising a curing agent.

19. The coating composition as described in claim 18, wherein the curing agent is a block polyisocyanate compound.

20. A cationically electrodepositable bath comprising the coating composition as described in claim 1.

21. An article coated with the coating composition as described in claim 1.

22. The coating composition as described in claim 1, wherein the amine compound is selected from the group consisting of methylamine, ethylamine, n-propylamine, isopropylamine, monoethanolamine, n-propanolamine, isopropanolamine, diethylamine, diethanolamine, di-n-propanolamine, di-iso-propanolamine, N-methylethanolamine, N-ethylethanolamine, ethylenediamine, diethylenetriamine, hydroxyethylaminoethylamine, ethylaminoethylamine, methylaminopropylamine, dimethylaminoethylamine and dimethylaminopropylamine.

* * * * *